United States Patent

Pedersen

[11] 4,016,369
[45] Apr. 5, 1977

[54] ADDRESSING ARRANGEMENTS FOR COMMUNICATIONS NETWORKS

[75] Inventor: Thomas Josef Pedersen, Lincroft, N.J.

[73] Assignee: Bell Telephone Laboratories, Incorporated, Murray Hill, N.J.

[22] Filed: Mar. 9, 1976

[21] Appl. No.: 665,171

[52] U.S. Cl. ............... 179/15 AL; 340/147 R; 340/172.5
[51] Int. Cl.² ............... H04Q 11/04; H04Q 3/04
[58] Field of Search ..... 179/15 AL, 15 BA, 15 BV; 340/172.5, 147 R, 178

[56] References Cited

UNITED STATES PATENTS

| | | | |
|---|---|---|---|
| 3,643,030 | 2/1972 | Sparrendahl | 179/15 AL |
| 3,652,993 | 3/1972 | Bridwell | 340/147 R |
| 3,952,162 | 4/1976 | Texier | 179/15 BV |

OTHER PUBLICATIONS

Communications of the ACM; vol. 2, No. 10; Oct. 1959 "Shift Register Code for Indexing Applications" pp. 40–43.

Primary Examiner—David L. Stewart
Attorney, Agent, or Firm—John Francis Moran

[57] ABSTRACT

An addressing arrangement is disclosed for systems in which communication is required between a main device and a plurality of associate devices. In the arrangement, access messages are used corresponding to states of shift register sequences. When the main device issues an access message, each associate device transforms the received access message to another access message which is applied to a subsequent associate device. The transformation of access messages allows the associate devices to be identical to each other and respond to the same predetermined access message since each device is uniquely identified by its location in the system. Each associate device also has the capability of being accessed by a prescribed access message which is not transformed by the associate device as it propagates through the system. Variation of the extent and the direction of transformation in another arrangement provides a means of uniquely identifying the source of information transmitted from an associate device to the main device.

9 Claims, 6 Drawing Figures

ADDRESSING ARRANGEMENTS FOR COMMUNICATIONS NETWORKS

BACKGROUND OF THE INVENTION

This invention relates to information processing and communication systems and, more particularly, to digital addressing arrangements for such systems wherein the address messages are transformed at selected locations while propagating through the system.

It is a common practice in the present state of the digital data processing and communications art to transmit and receive digital information on a common communication link between a multiplicity of subsystems, computers, remote terminals or stations, peripheral devices, sensors or output devices, and the like. At a main device or controller of such systems, each peripheral or associate device is uniquely accessed by transmitting a selected one of a plurality of access messages over a common address link to the associate devices. Two conventional arrangements are generally used to obtain this practice.

First, the address link is connected in the same identical manner to each of the associate devices. Each associate device at any one of the connections to the address link must be specially designed to recognize and/or originate a particular access message. This arrangement offers the advantage of having identical address links between the devices so that the unique property of an access message is the characteristic of the associate device rather than the connection thereto of the address link. The disadvantage is that the associate devices are unique and not interchangeable.

Another arrangement is to have a unique subset of a group of conductors comprising the address link connected to each associate device. The advantage of this arrangement is that the unique characteristic of each associate device is a property of the connection thereto enabling all the associate devices to be identical and thus interchangeable. The disadvantages are that such an arrangement is rather inflexible and is susceptible to craft errors in making the connections.

A primary object of the present invention is to provide an addressing arrangement for a main device and a plurality of identical associate devices that are identically connected to an address link and yet have each associate device uniquely identified by the main device.

A related object is to provide an addressing arrangement that is readily and simply implemented.

A further object is to provide an addressing arrangement wherein a universal access message feature is efficiently provided and the unique access message of a particular associate device is the same whether that device is the originator or recipient of information on the common communication link.

SUMMARY OF THE INVENTION

The invention in its various aspects overcomes the disadvantages of the prior art address arrangements. Broadly, it utilizes shift register sequences as access messages to simplify implementing hardware. In some of its more specific aspects, the invention complements the implementation thereof by utilizing selective distributive sequencing through the shift register sequences to provide both the unique and the universal properties of the access messages.

In its broader aspects, the invention takes the form of means for providing access in a communications or processing system comprising a main device and a plurality of associate devices. The main device generates a selected one of a plurality of access messages each of which uniquely corresponds to one of the associate devices. Each associate device receives an access message and transforms it in a predetermined manner to produce another one of the plurality of access messages which is applied to a subsequent associate device. Each associate device is responsive to the same one of the access messages since each associate device receives a different access message due to the variation in the number of transformations. Accordingly, the unique property of the access message at the main device is by virtue of its position in the plurality of associate devices. Thus, all associate devices are identical to each other and yet are uniquely accessed by the main device.

In some of its more specific aspects, the plurality of access messages corresponds to states of a predetermined shift register sequence and gates at each associate device transform the received access message corresponding to one state to another access message corresponding to the next successive state of the predetermined shift register sequence. In accordance with these aspects, each unique access message at the main device corresponds to one state of the predetermined shift register sequence which is a maximum length sequence. An additional aspect of the invention is that each associate device includes a gate responsive to a prescribed access message which is not transformed by the associate devices and serves as a universal access message. In accordance with a particularly advantageous embodiment of the invention, each associate device transmits the access messages unaltered or by transforming it in one of two different ways. When information is transmitted from an associate device to the main device in this embodiment, an access message is returned to the main device to identify uniquely the source of information.

BRIEF DESCRIPTION OF THE DRAWING

A more complete understanding of the invention and the various features, additional objectives, and advantages thereof may be more readily appreciated and better understood by reference to the following detailed description in conjunction with the drawing.

DETAILED DESCRIPTION

Before the inventive aspects of the illustrative embodiments are discussed in detail, related prior art concerning shift register sequences will be presented to provide a basis for a thorough explanation. A four stage shift register sequence will be discussed since the specific illustrative embodiments of the invention are designed to use such a sequence. The inventive principles, however, are equally applicable to any shift register sequence including any number of unique states.

Figure 1:
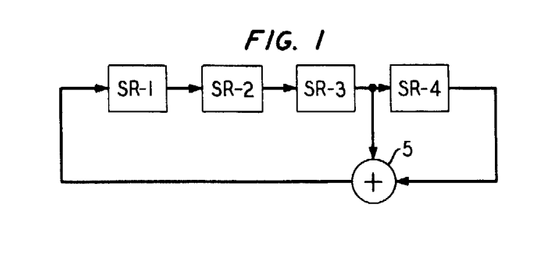
FIGS. 1 and 2 serve to provide background information for a thorough understanding of the inventive principles.
Figure 3:
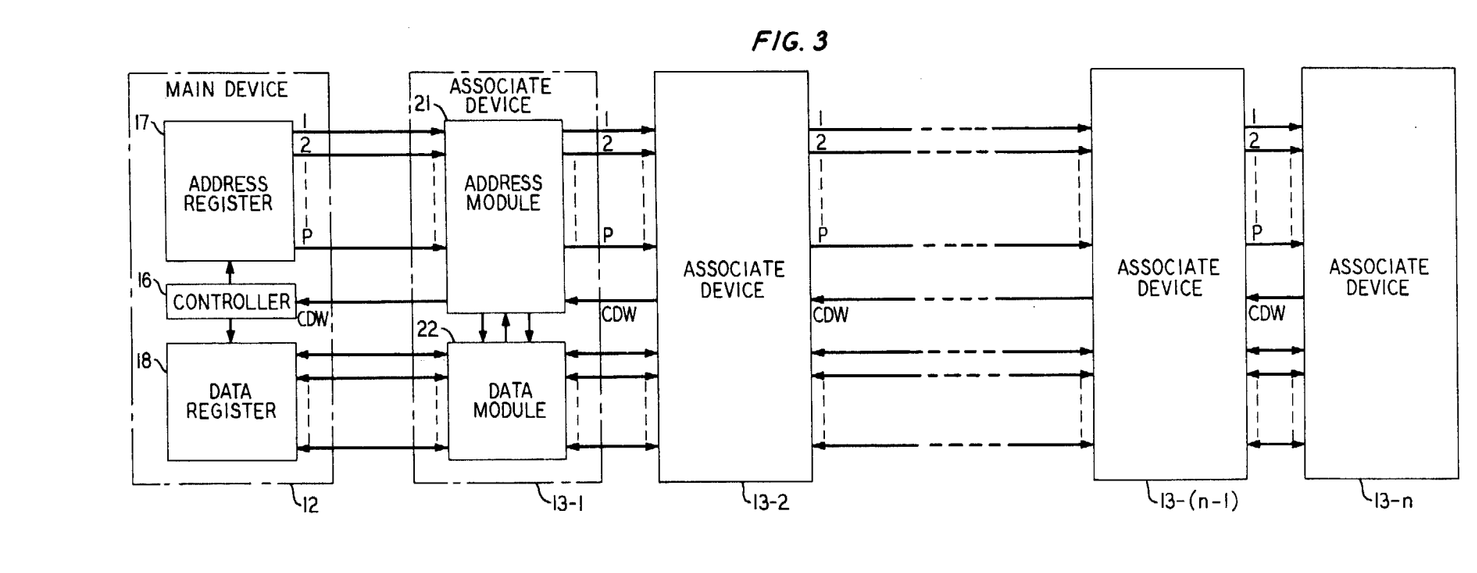
FIG. 3 is a system serving as an illustrative application of the invention.

In FIG. 1, a 4-bit shift register is schematically shown that generates the state sequence listed in Table I. The four stage shift register has the outputs of the third and fourth stages combined in modulo-2 adder 5, which performs the same function as an Exclusive OR gate, and applied as feedback to the input of the first stage. This register cycles through all of the possible $2^4-1$ or 15 binary states capable of being contained within a 4-bit binary number except for the value of 0000. Such a sequence listed in Table I is called a maximum length feedback shift register sequence. Further information concerning shift register sequences, especially from a more theoretical point of view, is available in a number of texts; for example, see *Information Theory and Reliable Communication*, pages 230–234 by R. G. Gallager, copyrighted 1968 by John Wiley and Sons, Inc. An all zero state is not included since the shift register will not cycle out of this condition. Utilization of a maximum length sequence as the predetermined set of access messages in the invention allows the greatest number of associate devices to be uniquely addressed for a given number of characters in the access message.

The following table lists states of four characters, which are used as unique access messages in the system of FIG. 3, in a maximum length shift register sequence. The first character to the left in each state is the content of the SR-4 stage of the shift register in FIG. 1, while the last character is the content of stage SR-1. The second and third characters respectively correspond to stages SR-3 and SR-2.

TABLE I

| SEQUENCE NUMBER | REGISTER CONTENTS (STATES) | SEQUENCE NUMBER | REGISTER CONTENTS (STATES) |
| --- | --- | --- | --- |
| 1 | 1110 | 9 | 0010 |
| 2 | 1101 | 10 | 0100 |
| 3 | 1010 | 11 | 1000 |
| 4 | 0101 | 12 | 0001 |
| 5 | 1011 | 13 | 0011 |
| 6 | 0110 | 14 | 0111 |
| 7 | 1100 | 15 | 1111 |
| 8 | 1001 | | |

Figure 2:
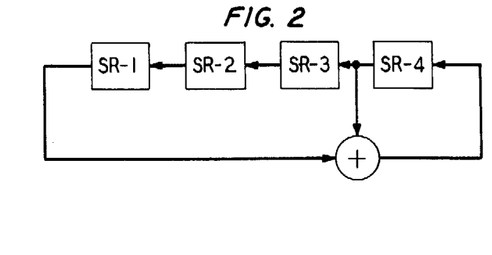

From Table I, each of the 15 states is unique and may be assigned as an access message for an associate device. It should be noted that for the order of the states in the seqence of Table I, an opposite order of the same states is possible. The opposite order is analogous to counting backward. FIG. 2 is a schematic diagram of a 4-stage shift register that generates the opposite order of states. Hereinafter the first order is designated "normal" while the opposite order is designated "reverse." The normal transformations may be termed incrementing and the reverse transformations as decrementing. This relationship is used to advantage in the embodiment of the invention illustrated by FIG. 5.

FIG. 3 illustrates a typical system wherein the inventive addressing arrangement may be utilized. The system comprises main device 12 and a plurality of associate devices, designated 13-1 thru 13-n. The devices are interconnected by an address bus of P conductors and a plurality of conductors in a data bus. Device 12 includes controller 16 which regulates the activities of address register 17 and data register 18. Address register 17 is capable of producing any one of a plurality of access messages on parallel rails 1 through P as directed by controller 16. Each access message produced by address register 17 is unique to one of the plurality of associate devices and may be used to transmit information either to or from device 12 to the particular associate device being addressed.

Associate device 13-1 is one of the plurality of identical associate devices which each include two modules shown as address module 21 and data module 22. When address register 17 of device 12 issues an access signal that is applied to the left side of address module 21, the module increments the received access message to produce another access message from its right side that is applied to associate device 13-2. Associate device 13-2 contains an identical address module which performs the same incrementing function for application to the next successive associate device. This process continues through to associate device 13-n. Also within address module 21 is a logical circuitry that is responsive to a particular access message. Since the access messages are incremented, each associate device receives a different access message. Although each address module is responsive to the same access message, only the particular associate device that receives the access message corresponding to the predetermined access message will respond. It should be noted that the registers at main device 12 are of conventional design and operation while all the associate devices are identical to each other but are uniquely identified at the main device. When access is gained, information or data from data register 18 may be applied to the data module of the responsive associate device. This situation is a case wherein information that originates at main device 12 is transmitted to the particular associate device which is uniquely accessed by address register 17.

Another feature included in each address module of associate devices 13-1 through 13-n is the capability to recognize a universal access message of the all zero state. Since the address module of each associate device increments the access message in accordance with a shift register sequence which will not cycle out of the all zero state, an all zero state access message issued by address register 17 of main device 12 is presented in the same form to all of the associate devices. This feature is particularly desirable when all of the data modules of the associate devices require common preliminary data in an operation commonly referred to as "initialization." Thus, all associate devices are simultaneously set to the same initial condition by a single operation.

In another mode of operation, the reverse operation takes place wherein information from the associate device is applied to data register 18 while the same relationship exists between address register 17 and the respective address module of the accessed associate device. In this mode, the data module which originates information signals changes the signal level on the Common Data Waiting (CDW) line connected to controller 16 in main device 12.

Controller 16, in main device 12, samples the level on the CDW line connected to all of the associate devices by signalling address register 17 to issue the universal access message. Information may then be transmitted from the data module acting as a source to data register 18 of main device 12 if the identity of the source need not be known to the main device. If the identity must be known, address register 17 then individually addresses the plurality of associate devices in a sequence of any desired order, for example, from the adjacent to the most distant device. When address register 17 produces an access message that matches the predetermined access message in the address module of the associate device acting as a source, that address module provides a logical one level on the CDW line to signal its identity to controller 16 of main device 12. Then information from the data module acting as a source is transmitted to data register 18.

After this operation occurs, controller 16 directs address register 17 to issue a universal access message and checks the status of the CDW line for additional data modules that are acting as sources. It should be noted that once the information is transferred from the data module that acts as a source, the corresponding address module resets its contribution on the CDW line back to a zero and relays signals on the line to device 12 from more remote associate devices. If one or more additional associate devices indicate they have information on the CDW line, controller 16 again repeats the foregoing operation until all associate devices supply information and the interrogation process is complete. This arrangement has the advantage of the access message at the main device being the same for both directions of information transmission.

Figure 4:
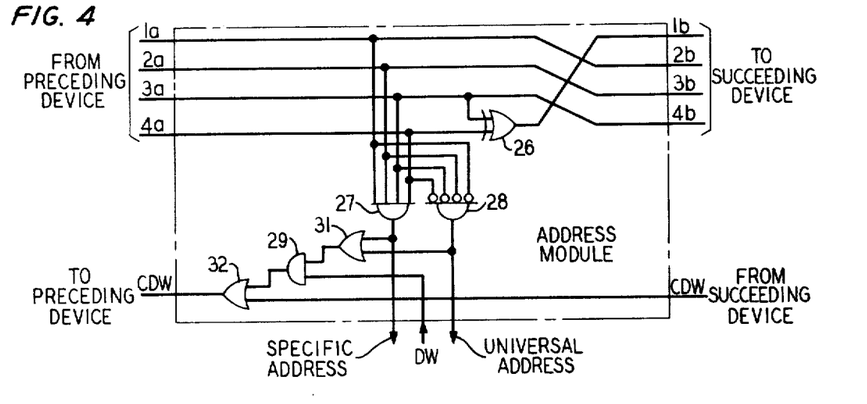
FIG. 4 is a circuit of an address module utilized in the system of FIG. 3.

FIG. 4 is a schematic diagram of a specific addressing arrangement for address module 21 in which the address bus contains four rails; i.e., the value of P in FIG. 3 is four. Terminals 1a–4a of the address module receive the incoming access message from either main device 12 or the immediately preceding associate device which is nearer to device 12. The address module then produces another access message, except in the case of the universal access message, at terminals 1b–4b for the next succeeding associate device. Exclusive OR gate 26 and the interconnections between the incoming and outgoing terminals transform a received state or access message to the next state in accordance with the shift register sequences shown in Table I. Such an arrangement is relatively simple and has the additional feature of passing the universal access message of all zeros on to succeeding associate devices unaltered.

AND gate 27, in the module, indicates when the received access message is all ones. This indication is applied to the corresponding data module of the address module. Similarly, NOR gate 28 indicates to the corresponding data module when the universal access message is received on terminals 1a–4a. Also connected to the address module is the CDW line which signals the status of the data modules in the associate devices to main device 12. When a data module has information for data register 18, it produces a signal on the DW terminal indicative of a logical one level. This signal is applied to AND gate 29. The output of OR gate 31 is applied to the other input of AND gate 29. The inputs of OR gate 31 are supplied by gates 27 and 28. The output of gate 27 enables gate 29 to pass the signal level on the DW terminal to OR gate 32. Gate 29 is enabled when either the predetermined access message appears at gate 27 or the universal access message appears at gate 28. Gate 32 then changes the signal on the CDW line coupled to the preceding associate device to a logical one level. Since all the address modules are identical, the signal on the CDW line originating from a remote associate device will be simply relayed to main device 12 through a cascade connection of OR gates identical to OR gate 32 in each one of the group of intermediate associate devices.

Figure 5:
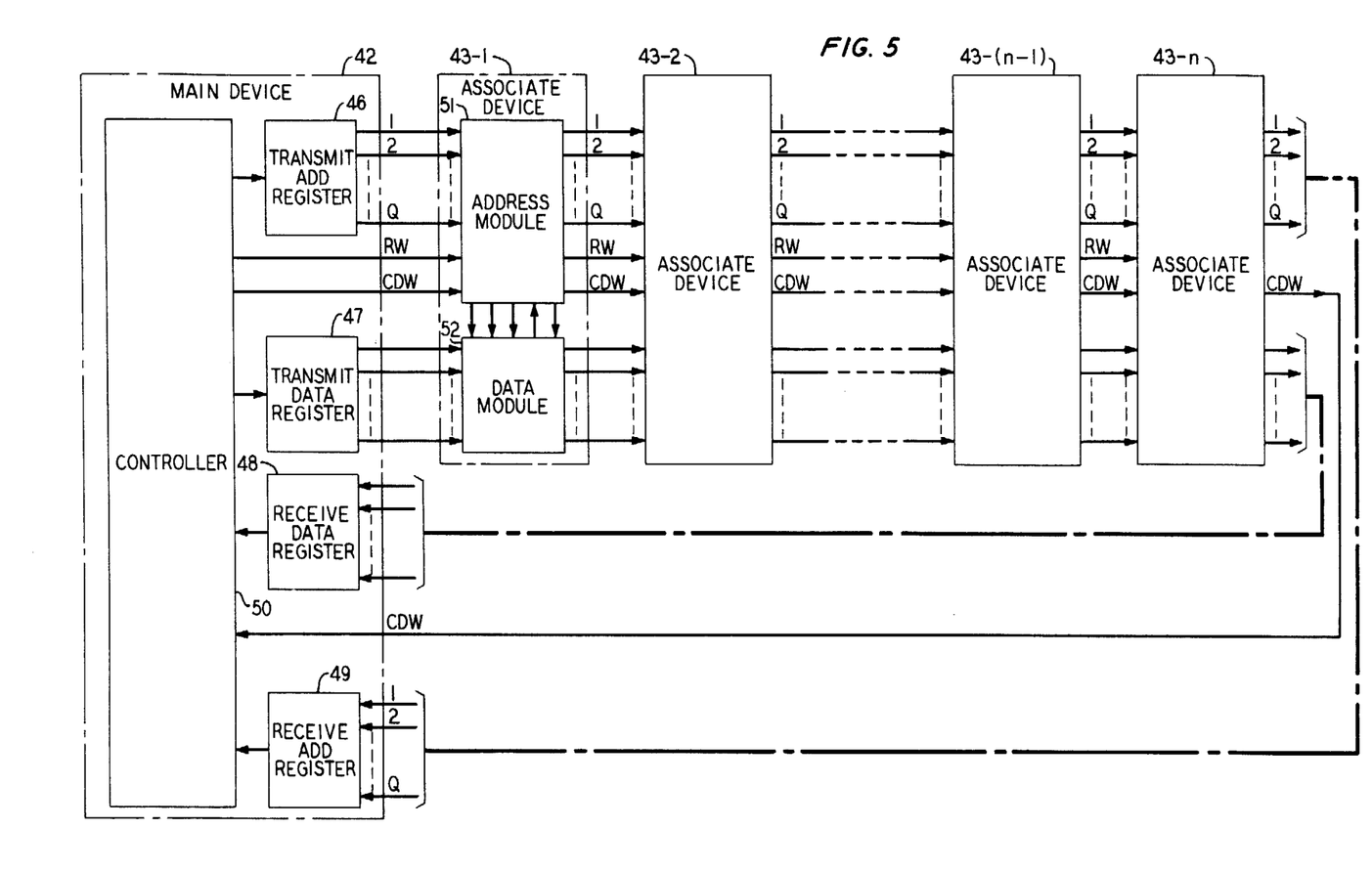
FIG. 5 is another system illustrating further features of the invention.

FIG. 5 illustrates another typical system similar to that shown in FIG. 3 wherein the inventive addressing arrangement may be utilized. The system of FIG. 5 generally comprises main device 42 and a plurality of associate devices designated 43-1 through 43-n. Device 42 includes transmit address register 46, transmit data register 47, receive address register 48 and receive data register 49 whose operations are all regulated by controller 50. The associate devices are serially connected together by an address bus and data bus which loop around back to main device 42. Each associate device, in the loop, contains an address module and a data module such as address module 51 and data module 52 in associate device 43-1. In general, the system of FIG. 5 operates in a manner similar to the operation of the system of FIG. 3. However, the address modules of this system provide additional advantageous features. Since the implementation of features are primarily dependent upon the arrangement contained in address module 51, the operation of the system of FIG. 5 will be discussed with reference to FIG. 6.

Figure 6:
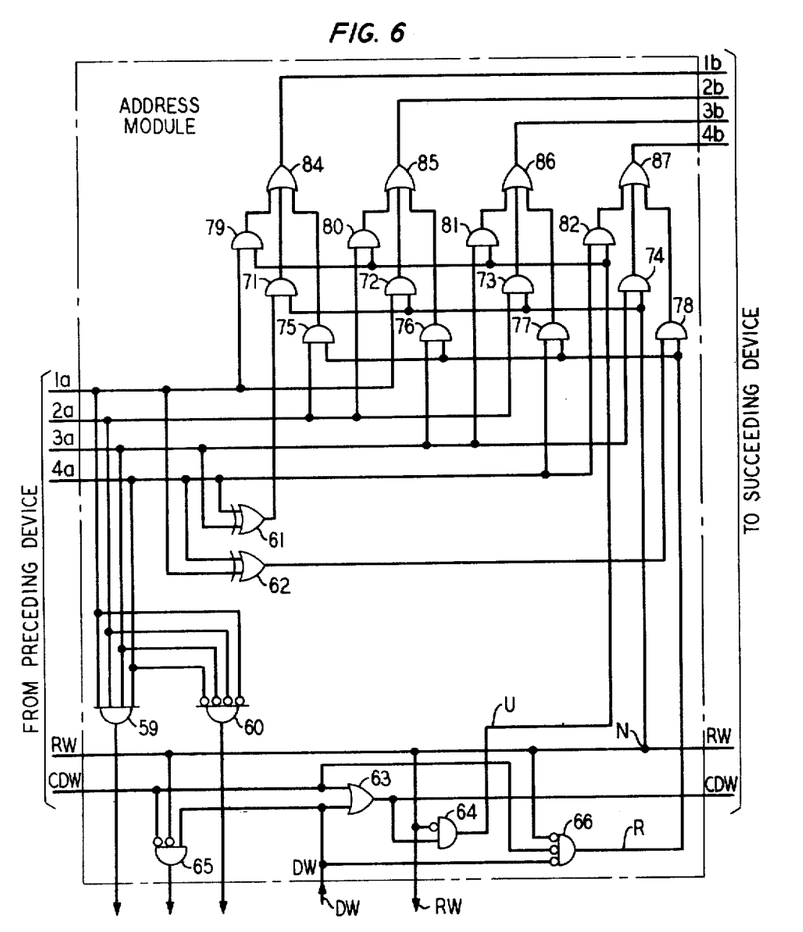
FIG. 6 is a circuit of an address module employed in the system of FIG. 5.

FIG. 6 is a schematic diagram of a specific addressing arrangement for address module 51 in which the value of Q, the number of address rails is four. Although four rails are utilized in the specific arrangement of FIG. 6, it is stressed that the principles disclosed herein are equally applicable to other numbers of address rails and corresponding different arrangements in the address modules of such systems. Access messages from device 42 of FIG. 5 are transmitted and transformed by the intervening associate devices to produce a signal that eventually appears at incoming terminals 1a–4a in FIG. 6. Terminals 1b–4b are the outgoing terminals to which are delivered access messages through the gating network comprising gates 61 and 62 and gates 71–87. Within the address module are two four-variable gates. AND gate 29 indicates an access message on terminals 1a–4a corresponding to the predetermined access message of all ones while NOR gate 60 indicates the universal access message of all zeroes by providing a one output. Gate 60 is used in an initialization process for the transfer of common data like gate 28 of FIG. 4 which serves in providing the same feature in the system of FIG. 3. These two outputs are applied to the corresponding data module. The address module operates in primarily three different ways which depend upon the signals produced by main device 42 and the relative status of the corresponding data module whith respect to the data modules in the other associate devices.

The first operating mode is very similar to the type of operation that was discussed in connection with FIG. 3. Specifically, the first mode is the situation when information from main device 42 or, more specifically, from transmit data register 47 is being applied to an associate device selected in accordance with the access message produced by transmit address register 46. Such a mode is designated as a "write mode" with respect to the operation of main device 42 although it should be understood that during this mode information or data may also be transmitted from the selected associate device to receive data register 48 of the main device. In this mode of operation, controller 50 provides a logical one level signal on the Read-Write (RW) line which is connected to all of the associate devices. The RW line indicates that information is going to be transferred from main device 42 to any one of the associate devices while register 46 issues an access message that provides an all ones pattern as the predetermined access message at the desired associate device. The gate in the address module of the particular associate device that corresponds to gate 59 then provides a logical one output. This signals the corresponding data module to receive information from register 47 in main device 42. All of the address modules, in the first mode, perform a transformation of the received access message to produce the next access message in accordance with the sequence of states in Table I. At this time, gates 64 and 66 issue signals so that only the group of AND gates 71–74 are enabled out of AND gates 71–82. More specifically, the RW line provides a logical one signal which enables AND gates 71–74 while gates 64 and 66 inhibit AND gates 75–82. The signal path that is completed between terminals 1a–4a to 1b–4b through the enabled AND gates and OR gates 84–87 corresponds to the fixed circuit between the corresponding terminals of FIG. 4. Thus, all of the address modules will sequence the access messages distributively through the shift register sequence of Table I in ascending order of states.

In the second mode of operation, information which originates at an associate device is to be applied to receive data register 48 of main device 42. This mode is also designated as a "read mode." Controller 50 produces a logical zero signal on the RW line and register 46 issues an access message of all logical ones. In this mode of operation, the address modules are divided into two groups which determine the way they operate. The address modules of the first group are located between main device 42 and the closest associate device thereto that has data or information for the main device. Since the associate device that acts as a source produces a logical one level on the DW terminal of its address module and the incoming CDW has a zero level signal, AND gate 65 senses these two conditions with the mode indication signal on the RW line and allows the associate device to seize the data line which provides the data transmission path to register 48 of main device 42. The other group of associate devices are the remaining ones in the system which are more remote from main device 12 including the associate device that seized the line. Of course, whether there are, and to what extent there are, associate devices in each group is determined by the location of the particular device that seizes the line.

While in the second mode of operation, the associate devices in the first group all have a number of common input signals which define their operation. Specifically, the signal on the RW line is a logical zero level and the same is true of the signal on the CDW line. The data modules of these associate devices do not have any original data and signal this condition by a zero level on the DW terminal. These three logical zero signals are applied to NOR gate 66 which produces a logical one output. This signal enables AND gates 75–78 which provide the input signals for OR gates 84–87 while AND gates 71–74 and 79–82 are inhibited. AND gates 71–74 are inhibited by the logical zero signal on the RW line and the logical zero produced by gate 64 inhibits AND gates 79–82. The operation of the enabled AND gates produces a connection from terminals 1a–4a to 1b–4b using Exclusive OR gate 62. This connection between terminals of the address module decrements the access messages through a state sequence in the reverse order so that the state sequences are distributively transformed in descending order from the sequence of states listed in Table I. Since transmit address register 46 of main device 42 produces an access message of all ones, transformation of the access message in the reverse sequence produces the same access message at the data originating associate device as register 46 produces in the first mode of operation for sending data to that associate device.

The associate devices in the second group during the second mode of operation have a different set of common inputs from those in the first group. Again the signal on the RW line has a logical zero level. The state of the signal on the CDW line is a logical one level for all those associate devices more remote than the particular associate device acting as a source. In the associate device acting as a source, the signal on the CDW line is a zero and the signal on the DW terminal is a logical one. The logical one level passes through OR gate 63 on to the CDW line which is connected to the subsequent associate devices.

The operation of the associate device acting as a source will now be considered. AND gate 64 is enabled by the output of OR gate 63 and the signal on the RW line. Gate 64 produces a logical one output which enables AND gates 79–82 which are connected to OR gates 84–87. The zero level signal on the RW line along with the zero level produced by the output of NOR gate 66 inhibits gates 71–78 so that the only through signal path from terminals 1a–4a to 1b–4b is via AND gates 79–82 and OR gates 84–87. This signal path is a straight through connection that delivers the same access message received on terminals 1a–4a to terminals 1b–4b. Thus the access message is transmitted by the address module unaltered.

In the remaining associate devices of the second group, the equivalent of gate 64 produces a logical one output. However, the logical one is due to the logical one on the incoming CDW line. As a result, the identical operating mode of gates 71–87 passes on the access message through these address modules in the unaltered form. Overall operation of the address modules in the associate devices of the second group is to pass on the access message that appears at the associate device acting as a source in unaltered form for application to receive address register 49 of main device 42. Thus, the access message appearing at register 49 is the same as is utilized in the first mode of operation by register 46 to address that associate device. Concurrent with the received access message is the application of data to receive data register 48. Thus, as information is being transmitted from an associate device to main device 42, an access message is also being received by the main device 42 which identifies the associate device acting as a source.

After all the information is transmitted from the associate device acting as a source to register 48, a single read transaction cycle is complete and the DW terminal of that associate device is set at a logical zero level. Main device 42 may then continue to issue the all ones access message from register 46 and to apply a logical zero level to the CDW line, thus permitting a succeeding read transaction cycle. Such cycles may be repeated until the CDW line returned to main device 42 provides a logical zero level to indicate that no associate device has data to be sent to the main device. Main device 42 may freely intersperse the read and write transaction cycles described in any order.

The described reading procedure is in the nature of a universal read in that the main device does not prescribe which of the associate devices is to apply data to the data bus. As mentioned in the foregoing, main device 42 may direct a specific associate device to apply information to the data bus. During a write cycle, the associate device selected by the access message transmitted from register 46 will execute some predetermined action depending upon the information simultaneously present on the data bus. Among those actions might be modification or replacement, in whole or in part, of the information on the data bus by the addressed associate device. No such action would take place at associate devices other than the selected one.

The operation of the address module of FIG. 6 may be described by the following truth table.

TABLE II

| INPUTS | | | ENABLE LEVELS | | | OUTPUT |
|---|---|---|---|---|---|---|
| RW | CDW | DW | U | N | R | CDW |
| 1 | 1 | 1 | 0 | 1 | 0 | 1 |
| 1 | 1 | 0 | 0 | 1 | 0 | 1 |
| 1 | 0 | 1 | 0 | 1 | 0 | 1 |
| 1 | 0 | 0 | 0 | 1 | 0 | 0 |
| 0 | 1 | 1 | 1 | 0 | 0 | 1 |
| 0 | 1 | 0 | 1 | 0 | 0 | 1 |
| 0 | 0 | 1 | 1 | 0 | 0 | 1 |
| 0 | 0 | 0 | 0 | 0 | 1 | 0 |

The three inputs columns in Table II are the signal levels at the RW line, CDW line and the DW terminal of the address module. The enable level columns indicate signals which enable the three groups of four AND gates connected to OR gates 84–87. These columns designated U (unaltered), N (normal) and R (reverse) are the three ways in which the address modules transmit access messages. The sources of U, N and R enable signal levels are respectively the output of gate 64, the signal on the RW line, and the output of gate 66. Such an arrangement of gates in the address module is a multiplexer which supplies one of three different combinations of a given group of input signals to terminals 1b–4b.

It is to be understood that the arrangement of address modules and systems described in the foregoing are merely illustrative of the application of the principles of the present invention. Another application of these principles can be in a system that transmits access messages in serial form with appropriate delays at the associate devices aiding in the transformations instead of the parallel arrangements disclosed herein. Furthermore, although each of the described systems include only one device capable of producing the plurality of access messages, it may be desirable to have more than one device with addressing capability in a system. Such chages, including numerous and varied other arrangements, may be utilized by those working in the art without departing from the spirit and scope of the invention.

What is claimed is:

1. A communication system comprising:
   a main device and at least one plurality of associate devices, generating means at said main device for producing any one of a plurality of access messages, each one of the plurality of access messages uniquely corresponding to one of said associate devices in the plurality, wherein the improvement comprises:
   transforming means at each of said associate devices for changing the received one of the plurality of access messages in a predetermined manner to produce a changed access message corresponding identically to another one of the plurality of access messages and for applying the changed access message to a subsequent associate device, and
   logical means, at each of said associate devices in circuit relationship with said transforming means, for responding to the same one of the plurality of access messages, each one of the plurality of said logical means being provided a different one of the plurality of access messages when said generating means issues one access message due to the individual operation of each of the plurality of said transforming means in changing its received access message so as to provide the unique correspondence of a particular associate device at said main device resulting from a number of transformations unique to each associate device.

2. A communication system in accordance with claim 1 wherein said generator means produces the plurality of access messages which corresponds to the states of a predetermined shift register sequence and said transforming means comprises gating means that transforms the received access message corresponding to one state to another access message corresponding to the next successive state of the predetermined shift register sequence.

3. A communicating system in accordance with claim 2 wherein each of said associate devices has a unique access message at said main device that corresponds to one state of the predetermined shift register sequence and said generator means produces the predetermined sequence which is a maximum length shift register sequence.

4. A communication system in accordance with claim 3 wherein each associate device further includes means responsive to a prescribed access message which remains the same while passing through said transforming means to that the access message at said subsequent associate device corresponds to the received access message and the prescribed access message is universal to all of said associate devices.

5. A communication system in accordance with claim 4 wherein said logical means comprises gating means that performs a logical AND operation on the characters constituting the received access message so that each of said associate devices responds to the same access message applied thereto.

6. A communication system in accordance with claim 5 further comprising conducting means connecting all of said devices together for transmission of data therebetween and detecting means at said main device responsive to any of said associate device signals operating as a source of information for said main device.

7. A communication system in accordance with claim 6 further comprising connecting means disposed as links between pairs of said associate devices and the plurality of said associate devices are serially cascaded by said connecting means, said connecting means applying the produced access message of said transforming means at one of said associate devices to the immediately succeeding associate device as the received access message for said transforming means therein, and said connecting means transmits data between said main device and each one of said associate devices in accordance with the access message produced by said generating means and the responses of said detecting means.

8. A communication system in accordance with claim 7 wherein said connecting means comprises means for signaling that said main device is ready to receive information from said associate devices and said transforming means further comprises multiplexing means responsive to said signaling means and cooperating with said gating means to transform the received access message to produce a first state or a second state as the access message for said subsequent associate device, said first state sequence corresponding to the next succeeding state when proceeding through said predetermined shift register sequence in a first direction, said second state corresponding to the next succeeding state when proceeding through said predetermined shift register sequence in a second direction opposite to said first direction, the transformation to said second state is used when said main device signals it is ready to receive information.

9. A communication system in accordance with claim 8 wherein said generating means produces a preselected access message for data originating associate devices serially cascaded along said connecting means and said connecting means is connected from the last associate device back to said main device and said multiplexer means includes another signal path which is a straight through signal path for transmitting access messages through associate devices in the same form so that said multiplexing means in the portion of associate devices after and including the data originating associate devices return the access message to said main device that was received at the data originating associate device.

* * * * *

UNITED STATES PATENT AND TRADEMARK OFFICE
CERTIFICATE OF CORRECTION

PATENT NO. : 4,016,369
DATED : April 5, 1977
INVENTOR(S) : Thomas J. Pedersen

It is certified that error appears in the above-identified patent and that said Letters Patent are hereby corrected as shown below:

Column 3, lines 31 through 42, Table I should read as follows:

TABLE I

| SEQUENCE NUMBER | REGISTER CONTENTS (STATES) | SEQUENCE NUMBER | REGISTER CONTENTS (STATES) |
|---|---|---|---|
| 1 | 1110 | 9 | 0110 |
| 2 | 1100 | 10 | 1101 |
| 3 | 1000 | 11 | 1010 |
| 4 | 0001 | 12 | 0101 |
| 5 | 0010 | 13 | 1011 |
| 6 | 0100 | 14 | 0111 |
| 7 | 1001 | 15 | 1111 |
| 8 | 0011 | | |

UNITED STATES PATENT AND TRADEMARK OFFICE
CERTIFICATE OF CORRECTION

PATENT NO. : 4,016,369
DATED : April 5, 1977
INVENTOR(S) : Thomas J. Pedersen

It is certified that error appears in the above-identified patent and that said Letters Patent are hereby corrected as shown below:

```
Column 6,  line 48, "whith" should read --with--.
Column 9,  line 53, "chages" should read --changes--.
Column 10, line 39, "to" should be --so--.
Column 12, line 14, "devices" should be --device--.
```

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*